US011714746B2

(12) United States Patent
Brzóska et al.

(10) Patent No.: US 11,714,746 B2
(45) Date of Patent: Aug. 1, 2023

(54) COMPARING THE PERFORMANCE OF MULTIPLE APPLICATION VERSIONS

(71) Applicant: Zendesk, Inc., San Francisco, CA (US)

(72) Inventors: Bazyli W. Brzóska, San Francisco, CA (US); Rafal Jerzy Lindemann, Warsaw (PL)

(73) Assignee: Zendesk, Inc., San Francisco, CA (US)

( * ) Notice: Subject to any disclaimer, the term of this patent is extended or adjusted under 35 U.S.C. 154(b) by 38 days.

(21) Appl. No.: 17/375,164

(22) Filed: Jul. 14, 2021

(65) Prior Publication Data

US 2023/0023876 A1 Jan. 26, 2023

(51) Int. Cl.
*G06F 11/36* (2006.01)
*G06F 9/48* (2006.01)

(52) U.S. Cl.
CPC ............ *G06F 11/3688* (2013.01); *G06F 9/48* (2013.01); *G06F 11/368* (2013.01); *G06F 11/3692* (2013.01)

(58) Field of Classification Search
CPC ............... G06F 11/3688; G06F 11/368; G06F 11/3692; G06F 9/48
See application file for complete search history.

(56) References Cited

U.S. PATENT DOCUMENTS

| | | | | |
|---|---|---|---|---|
| 9,176,843 | B1* | 11/2015 | Ismael | ................... G06N 20/00 |
| 2018/0253372 | A1* | 9/2018 | Colaiacomo | ........ G06F 11/3692 |
| 2020/0278920 | A1* | 9/2020 | Khakare | ............. G06F 11/3688 |
| 2020/0364133 | A1* | 11/2020 | Vidal | .................. G06F 9/45558 |

OTHER PUBLICATIONS

Alcocer, Juan Pablo Sandoval, Fabian Beck, and Alexandre Bergel. "Performance evolution matrix: Visualizing performance variations along software versions." 2019 Working conference on software visualization (VISSOFT). IEEE, 2019. (Year: 2019).*

(Continued)

*Primary Examiner* — Kevin L Young
*Assistant Examiner* — Joanne G Macasiano
(74) *Attorney, Agent, or Firm* — Park, Vaughan, Fleming & Dowler LLP; Daniel E. Vaughan

(57) ABSTRACT

Comparing the performance of multiple versions or branches/paths of an application (e.g., a web service or application) may be conducted within a suitable computing environment. Such an environment may be virtual in nature, cloud-based, or server-based, and is hosted with tools for simultaneously (or nearly simultaneously) executing multiple containers or other code collections with the same or similar operating conditions (e.g., network congestion, resource contention, memory management schemes). By arranging the performance test of different application versions in different sequences executed in parallel in separate containers, fair comparisons of the tested applications will be obtained. Testing sequences may be executed multiple times, and metrics are collected during each execution. Afterward, the results for each metric for each code version are aggregated and displayed to indicate their relative performance quantitatively and/or qualitatively.

23 Claims, 3 Drawing Sheets

(56) References Cited

OTHER PUBLICATIONS

Reichelt, David Georg, and Stefan Kühne. "How to detect performance changes in software history: Performance analysis of software system versions." Companion of the 2018 ACM/SPEC International Conference on Performance Engineering. 2018. (Year: 2018).*

Alcocer, Juan Pablo Sandoval, et al. "Performance evolution blueprint: Understanding the impact of software evolution on performance." 2013 First IEEE Working Conference on Software Visualization (VISSOFT). IEEE, 2013. (Year: 2013).*

Avritzer, Alberto, et al. "PPTAM: production and performance testing based application monitoring." Companion of the 2019 ACM/SPEC International Conference on Performance Engineering. 2019. (Year: 2019).*

"Score Variability", retrieved from https://github.com/GoogleChrome/lighthouse/blob/v6.4.1/docs/variability.md on Jul. 15, 2021.

Patrick Hulce, "Lighthouse Variance One-Pager", retrieved from https://docs.google.com/document/d/1AujmeKvBhzr-d8lsB7zPeS-vOtxCdw2GnspKpxJ7d_l/edit on Jul. 15, 2021.

Patrick Hulce, "Lighthouse Metric Variability and Accuracy", retrieved from https://docs.google.com/document/d/1BqtL-nG53rxWOI5RO0pItSRPowZVnYJ_gBEQCJ5EeUE/edit on Jul. 15, 2021.

https://github.com/GoogleChrome/lighthouse-ci/blob/4f9bcdc9acd99e46d089b0e13d1ee241b8b298f4/docs/troubleshooting.md#im-seeing-differences-in-the-results-even-though-i-didnt-change-anything retrieved on Jul. 15, 2021.

https://github.com/GoogleChrome/lighthouse-ci/blob/main/docs/configuration.md#aggregation-methods retrieved on Jul. 15, 2021.

\* cited by examiner

Host/Development Environment 102

Compare [/working/deals] with [master version]

| Metric | A Better | B Better | Difference | A | B |
|---|---|---|---|---|---|
| First Page View | 0% | 100% | + 83.1% | 8 s | 4.4 s |
| Largest Content Paint | 0% | 100% | + 111.4% | 7.7 s | 3.6 s |
| Time to Interactive | 0% | 50% | + 73.6% | 7.8 s | 4.5 s |
| Main-Thread Work | 0% | 100% | + 20.3% | 5.8 s | 4.8 s |
| JS Execution Time | 0% | 100% | + 14.7% | 3.3 s | 2.9 s |
| JS Modules Loaded | 0% | 100% | + 0.1% | 4362 | 4359 |
| JS Bundles Loaded | 0% | 0% | None | 113 | 113 |
| API Calls | 25% | 25% | None | 66.4 | 66.4 |
| API Data Transferred | 56% | 44% | None | 41.3 KB | 41.3 KB |
| API Latency | 49% | 51% | - 5.7% | 293 ms | 310.8 ms |
| Total Data Transferred | 13% | 87% | + 7117% | 4866.9 KB | 67.4 KB |

FIG. 2

COMPARING THE PERFORMANCE OF MULTIPLE APPLICATION VERSIONS

BACKGROUND

This disclosure relates to the field of measuring application performance. More particularly, a system and methods are provided for measuring and comparing the performance of multiple versions of an application or other set of executable program code.

Software applications are often updated to use computer resources (e.g., memory space, storage space, processor time) more efficiently, add functionality, modify the appearance of a user interface, correct programming errors, and/or for other purposes. While many code changes are straightforward and do little or nothing to alter the performance of the code or its resource usage, other changes may contain errors or cause unexpected degradation in performance, such as by invoking unnecessary resources.

Some code changes are tested before going live, some are not, but existing testing routines and tools may fail to uncover a decrease in performance from a previous version of the modified code. For example, a traditional performance testing or monitoring tool may perform tests at different times and/or with different computer resource configurations or conditions. Others simply provide static measures of one code version so that its performance can be tracked over time, without comparing it with another version.

Depending on when a given test is executed, a performance test executed upon one version of an application may enjoy more memory space, a faster processor, less network congestion and/or other beneficial conditions than another performance test conducted at a different time. If not conducted in comparable environments, with similar limitations or constraints, the results may be skewed and a version of code that is actually less efficient may appear more efficient than another, better, version of the code.

SUMMARY

In some embodiments, systems and methods are provided for measuring the performance of multiple versions of an application or set of program code under conditions that are similar if not identical. In these embodiments, performance is measured while the multiple versions execute simultaneously in a computing environment such as GitHub™, AWS™ or Amazon Web Services™, or Microsoft Azure™ so that each version encounters similar resource configurations and constraints. For example, separate Amazon Lambda™ functions may be configured to execute all application versions or sets of code in a different order in each function, or to execute different versions in different functions, and pairs of functions may be executed simultaneously or nearly simultaneously.

During some or all application executions, multiple performance metrics are collected to measure resource consumption (e.g., processor time, memory, network bandwidth) and/or other indicators of performance. In some embodiments, the metrics may include time to First Page View, Time to Interactive, Execution Time, Main-Thread Work, Number of Code Blocks Loaded (e.g., JavaScript® modules, JavaScript bundles), Number of Calls (e.g., API or Application Programming Interface calls), Amount of Data Transferred, etc. Some metrics may be collected automatically by the computing environment and/or some metrics may be collected using appropriate instrumentation embedded in the application instances. For example, Google Lighthouse™ may be used to execute the application instances and may collect minimal metrics. Other metrics may be obtained using plug-ins, add-ons, appropriate instrumentation, and/or other tools.

Upon conclusion of execution, the collected metrics are compared to determine which instance of the application performed better. In some embodiments, each instance is executed multiple times and results of each instance's multiple executions are combined in some way (e.g., the average or median value). Outlier results may be discarded before being combined.

In some embodiments, instead of simply reporting metric values, results are automatically compared to indicate which instance performed better with regard to one or more of the observed metrics. For example, one instance may have produced a faster (or slower) first page view in X % of iterations while another instance may have performed more (or fewer) calls in Y % of iterations. As specified above, each iteration of testing may involve simultaneous execution of all the application versions that are being tested, possibly in different orders or permutations.

DESCRIPTION OF THE FIGURES

FIG. 2 illustrates an interface for displaying results of multiple iterations of application performance testing, in accordance with some embodiments.

DETAILED DESCRIPTION

Figure 1:
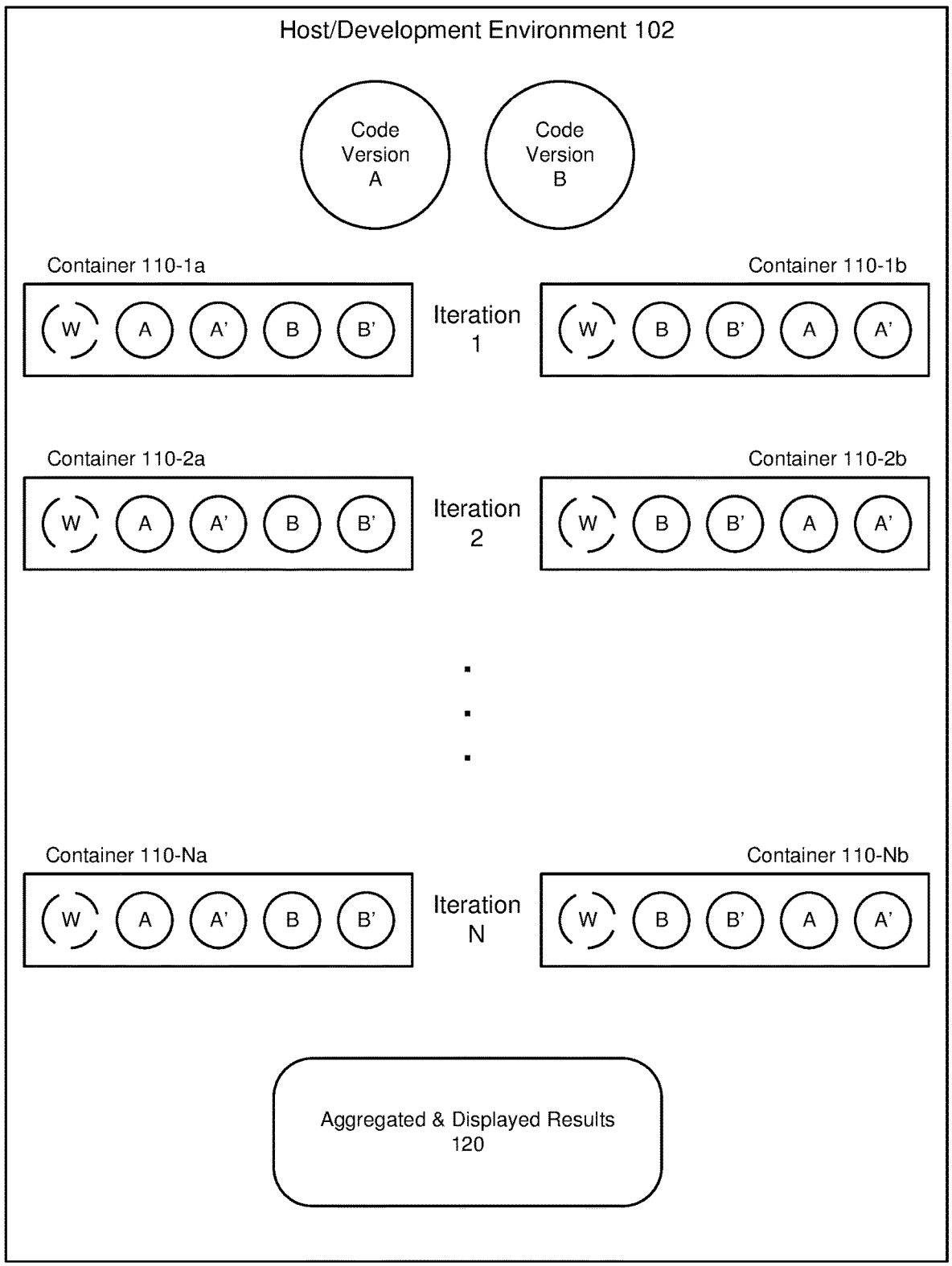
FIG. 1 is a block diagram depicting the scheduling of multiple iterations of application performance testing, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system and methods are provided for comparatively testing multiple versions of a software application or other set of program code. In different implementations, testing may involve end-to-end execution of different versions of an application (e.g., a web-based application) or execution of just one or more branches, blocks or other subsets of different versions of an application or other set of code.

In these embodiments, the different versions of code are executed simultaneously or nearly simultaneously in the same computing environment. For example, within one common environment, which illustratively may be virtual or cloud-based (e.g., Amazon Web Services or AWS™), or a hosted development environment (e.g., GitHub™), the different versions may be packaged and executed in different services or containers (e.g., different AWS Lambda™ functions) or all versions may be included in each of multiple services or containers but scheduled in a different order within each one.

For example, when two code versions are being tested (e.g., versions A and B), two services/containers may be configured. The first one executes the versions in the order A, B while the other executes the versions in the order B, A. With three code versions (e.g., A, B, C), three services/containers may be configured to execute them in the following sequences: A, B, C; B, C, A; C, A, B Multiple services/containers may be executed simultaneously so that the different code versions encounter the same (or substantially the same) conditions and/or limitations in terms of resources (e.g., network congestion, memory management, processor availability, browser issues), thus overcoming variable operating conditions. The different services may be simultaneously executed multiple (e.g., 4, 8, 12) times with appropriate metrics collected during every run, as discussed further below.

Within a container, a code version may be executed using a suitable tool, such as Google Lighthouse™, and/or the code may be instrumented to produce one or more metrics. In some implementations, one or more plug-ins or add-ons are added to a tool such as Lighthouse to gather specific metrics, to output results via a customized interface, to enable it to test an entire application versus just a web page, to execute multiple versions of code instead of just one, and/or for other purposes.

Metrics that are collected during the multiple executions of each version of the tested code are aggregated in some manner before being displayed for a user (e.g., a developer, a tester, an administrator). The metrics for each code version may be reported quantitatively, with specific values reflecting each metric's value, and/or qualitatively, by identifying how often each code version performed better than the other version(s) with regard to each metric (e.g., as a percentage).

In some embodiments, if no version of the tested code clearly performs better than the other(s), multiple iterations of testing may be automatically re-initiated one or more times until either a clear 'winner' emerges or a threshold number of testing iterations has been executed.

FIG. 1 is a block diagram depicting the scheduling of multiple iterations of comparative code testing, according to some embodiments.

In these embodiments, code versions A and B represent different versions of an application or other set of program code to be compared in terms of performance, as measured by any number and mix of metrics. Although only two versions of the code are compared in these embodiments, additional versions may be compared in other embodiments. Code version A or version B may represent a live or current version of the software, while the other version may be a recently modified version of the software. Each version may be a complete application or may be a branch, block, path, or other subset of a complete application. Although execution of either version may involve manipulation and/or display of one or more web pages, both versions perform tasks other than just rendering web pages.

Host/development environment 102 is a computing environment that facilitates development and/or testing of code. For example, environment 102 may include or may be GitHub™ or a similar development platform (e.g., Source-Forge™, GitLab™, BitBucket™), may be self-hosted by the owner or creator of the software.

Environment 102 includes or supports tools and services for analyzing or monitoring execution of browser-based software (e.g., web applications, web sites, web pages), such as Google Lighthouse™, Screpy, DareBoost, GTmetrix, and/or others. Environment 102 also includes or supports virtual or cloud-based services such as AWS™, AWS Lambda™, Azure™, Azure Functions, Google™ Cloud Functions, Serverless Framework, and so on.

In embodiments illustrated in FIG. 1, N iterations (N>2) are conducted in which code versions A and B execute simultaneously, or nearly simultaneously (e.g., within seconds). Each iteration involves execution of two containers, services, functions, threads, or other logical constructs that provide a common setting or resource context for executing code. Thus, iteration 1 of the performance testing operates upon containers 110-1a and 110-1b, which execute simultaneously, iteration 2 operates upon containers 110-2a and 110-2b, and iteration N operates upon containers 110-Na and 110-Nb. In some illustrative embodiments, each container represents an AWS Lambda function that hosts an instance of Google Lighthouse.

Illustrative container 110-1a comprises an optional warmup code execution (W), followed in sequence by execution of code version A without caching (A), code version A with caching (A'), code version B without caching (B), and code version B with caching (B'). When a code version is executed 'without caching,' no resources and/or content invoked during execution of the code are cached prior to execution, whereas 'with caching' signifies that some invoked resources/content may be cached (e.g., because the same code was just executed). For example, caching of resources that will or would be invoked by a code version may be disabled or inactive during the 'without caching' occurrences, while such caching is enabled or active during the 'with caching' occurrences.

Illustrative container 110-1b comprises another optional warmup code execution (W), followed in sequence by execution of code version B without caching (B), code version B with caching (B'), code version A without caching (A), and code version A with caching (A'). As already indicated, execution of each pair of containers (e.g., containers 110-1a and 110-1b) is initiated simultaneously or nearly simultaneously so that they execute concurrently or in parallel.

In some embodiments, all warmup code executions across all containers are the same and may involve either code version (A or B) or some other code altogether (e.g., a combination of A and B). In some other embodiments, code executed during warmup code execution W is either code version A or B and is the same code as the subsequent entity. Thus, in these other embodiments, the warmup code in containers 110-1a, 110-2a, and 110-Na is code version A, while the warmup code in containers 110-1b, 110-2b, and 110-Nb is code version B. Note that a cache may be flushed after the warmup code is executed (or caching may be disabled while the warmup code is executed) so that no resources or content are cached prior to the 'without caching' versions of A and B.

Results of the execution of warmup code (e.g., metrics observed during the execution) are automatically discarded afterward or, alternatively, are never gathered. Such metrics may be skewed because they reflect the first code executions within the containers and thus may suffer from latency, overhead, and/or other factors that decrease the apparent performance of the code and that will not be encountered by other code that executes within the container.

Metrics are collected during the N iterations for the non-warmup executions, and are aggregated and displayed 120 after execution of the final iteration. The aggregated quantitative value output for each metric and for each code version may be the average, the median, or some other value representative of executions of the code version. In addition to the quantitative values, for each metric a qualitative indication may be calculated and displayed that indicates how often one code version performed better (or worse) than the other version with regard to the metric.

Table 1 identifies illustrative metrics that are collected and aggregated in some embodiments. In other embodiments the same metrics and/or others may be gathered.

TABLE 1

| Metric | Description |
| --- | --- |
| First Page View | Time until first page is displayed |
| Largest Contentful Paint | Time until largest content above the fold is complete |
| Time to Interactive | Time until user can interact with application |
| Main-Thread Work | Time until main-thread finishes with first page |
| JS Execution Time | Time spent executing JavaScript |
| JS Modules Loaded | Number of JavaScript modules loaded |
| JS Bundles Loaded | Number of JavaScript bundles |
| API Calls | Number of API calls made |
| API Data Transferred | Amount of data transferred via API calls |
| API Latency | Total latency experienced during API calls |
| Total Data Transferred | Total amount of data transferred |

Values for some of the illustrative metrics are time measurements (e.g., seconds, milliseconds), such as First Page View, Largest Contentful Paint, Time to Interactive, Main-Thread Work, JS Execution Time, and API Latency. Other values are expressed in scalar form, such as JS Modules Loaded and JS Bundles Loaded (e.g., numbers of files), and API Calls (e.g., numbers of calls made). Yet other metric values are measured in terms of amount of data, such as API Data Transferred and Total Data Transferred, which may be expressed in bytes, kilobytes, megabytes, etc.

FIG. 2 illustrates an interface for displaying results of multiple iterations of code testing, according to some embodiments.

In these embodiments, within environment 102 a user (e.g., an engineer, a developer) completes dialog 202 to select two versions of code to comparatively execute. In the illustrated embodiment, the user has chosen the path or branch "/working/deals" as one of the two versions (e.g., represented as A) and the production version of the application code as the other (e.g., represented as B). Thus, in this scenario, the user is comparing the execution of a new or modified version of the identified branch of the application against the branch as it exists in the production or master version of the application. One or both code versions may be identified using a URL (Uniform Resource Locator), a code path or some other identifier. In some implementations, the production version of a set of code being tested may be automatically selected as one of the versions to be compared.

In some embodiments, a user may be offered other configuration options. For example, he or she may select a number of iterations to be executed, specify whether and when warmup code should be executed, identify the code to be used as warmup code (if execution of warmup code is desired), specify the order in which code versions are to execute in each service/container, and/or select which metrics to collect or not collect.

After execution of some number of iterations that execute simultaneously (e.g., as shown in FIG. 1), table 210 is displayed with results of the comparative executions. In the currently described embodiments, the table lists each of multiple metrics 212 and several corresponding values. Qualitative values 214 and 216 respectively indicate how often during the multiple iterations each version of the code performed better. In the context of environment 102, 'better' depends on the individual metric. Thus, for a metric such as First Page View, the code version that has a lower value, signifying less time required, is better.

Difference 218 indicates the aggregated amount of difference between the two code versions during the iterations (e.g., as a percentage). This may be the average difference, the median difference, or some other measure of the difference. Thus, a value of +83.1% indicates that code version B was found to perform 83.1% better than version A in terms of the First Page View metric (e.g., on average).

Quantitative values 220 and 222 respectively identify the aggregated values observed for code versions A and B for all iterations. Because these are aggregated values (e.g., average, median), they may superficially appear to conflict with other values. For example, for the API Data Transferred metric, code version A was found to be better 56% of the time but the quantitative measurements of this metric for both versions are the same. Although code version A may have performed better than code version B in a greater number of iterations (e.g., by transferring less data), they both achieved the same aggregated values.

Some values displayed in table 210 may help a developer quickly identify an apparent problem with either version of the code. For example, for the Total Data Transferred metric, code version A transferred substantially more data than version B. This may indicate that code version A refers to and causes a large amount of information (e.g., content, other code) to be loaded or transferred that is not actually needed.

Figure 3:
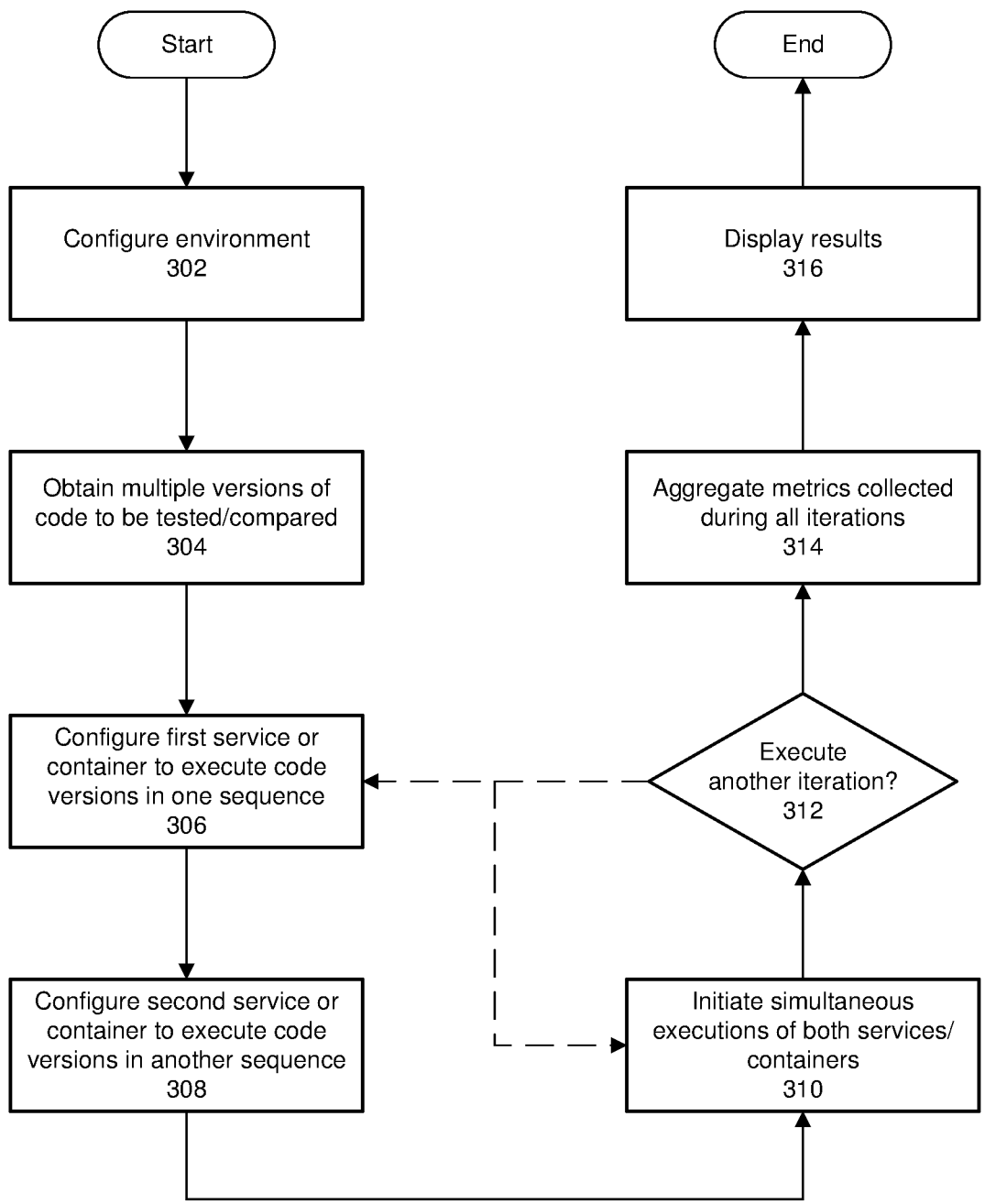
FIG. 3 is a flow chart illustrating a method of conducting comparative application performance testing, in accordance with some embodiments.

FIG. 3 is a flow chart illustrating a method of performing comparative application testing, according to some embodiments.

In these embodiments, the method occurs within a suitably configured development or testing environment, such as a GitHub space that includes tools such as AWS Lambda, Google Lighthouse, Serverless Framework, etc. Other environments may be employed in other embodiments.

At 302 the operating environment is configured as necessary by navigating to a host site, loading necessary tools, plug-ins for tools, and so on. For example, in some embodiments one or more add-ins may be configured and/or loaded for tools such as Google Lighthouse (e.g., to collect desired metrics).

At 304 multiple versions of the code to be developed are obtained. They may be retrieved from storage, may be created, or may be received in some other manner. Illustratively, one version of the code is a live or production version, such as an application (e.g., a web-based application or service) that is currently in use. Another version may be a version of the same code that has been modified to include extra functionality; to add, modify, or remove some existing code; to test the operation or performance of a resource; etc.

At 306 a first service or container (e.g., an AWS Lambda function executing Google Lighthouse) is configured to execute the multiple code versions in a first sequence. Illustrative configurations are described above with reference to FIG. 1. For example, for a scenario in which two code versions are being tested with one designated "A" and the other "B," the first service may feature a warmup execution of A, followed by another execution of A without caching, then a final execution of A with caching, followed by an execution of B without caching and then an execution of B with caching.

At 308 a second service or container is configured to execute the multiple code versions in a second sequence different from the first. For example, the second service may feature a warmup execution of B, followed by another execution of B without caching, then a final execution of B with caching, followed by an execution of A without caching and then an execution of A with caching.

In some embodiments, execution of a code version (or all code versions) with caching may be omitted. This may be the case, for example, if no or few resources loaded by the code during execution can be cached, or if it is unlikely that the code would ever be executed when such resources are cached. In other embodiments, warmup executions may be omitted from some or all services/containers.

If more than two code versions are being compared, 306 and/or 308 are repeated as necessary to configure additional services.

At 310, simultaneous execution of the services is initiated. Although they may not commence execution at exactly the same time, their executions will occur in parallel or close enough in time such that they encounter (or likely encounter) the same operating conditions in terms of memory availability, network congestion, resource contention, etc. Thus, if not executed simultaneously, they may execute in quick succession.

At 312 a determination is made whether to execute another iteration. If so, the method returns to 306 or 308 if a new service is to be configured or if a different sequence of operation is desired within a service, or to 310 if the same services/containers can be reused. Otherwise, if the iterations are complete, the method advances to 314.

In some embodiments, a set number of iterations is performed (e.g., 8, 12). In other embodiments, iterations may continue (e.g., to a predetermined maximum number) until significant results are encountered for all, most, or at least some metrics collected during the iterations. To be "significant," one of the code versions may need to outperform the other by a threshold amount.

For example, with reference to FIG. 2, most results may be considered significant, such as those in which B outperformed A in 100% of iterations. In contrast, the results for metrics such as API Calls and API Latency may not be considered significant.

At 314 metrics collected during the multiple iterations are aggregated in some manner. As explained previously, metrics collected during warmup code executions may be discarded or, alternatively, may not even be collected. For other code version executions, however, they are collected for aggregation. Aggregating the results of a given metric may involve averaging them (with or without weighting), finding the median value, or performing some other operation.

At 316 the results are displayed, to include both quantitative values (e.g., the aggregated values for each metric for each code version) and qualitative assessments (e.g., indications regarding how often each version performed better or worse than the other).

After 316 the method ends or returns to operation 304 if additional testing is desired.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of comparing performances of multiple versions of a set of program code, the method comprising:
    initiating multiple simultaneous executions of the multiple versions of the set of program code by, for each of multiple iterations:
        configuring multiple separate service containers to sequentially operate the multiple versions of the set of program code in different orders; and
        simultaneously executing the multiple separate service containers;
    during the multiple simultaneous executions, collecting a plurality of metrics reflecting performance of the multiple versions of the set of program code;
    for each version of the set of program code, aggregating the plurality of metrics across the multiple simultaneous executions; and
    automatically displaying results that identify, for each metric, quantitative results for each of the multiple versions of the set of program code and a qualitative indication regarding relative performances of the multiple versions of the set of program code.

2. The method of claim 1, wherein the metrics reflect resource usage caused by execution of the multiple versions of the set of program code.

3. The method of claim 1, wherein each service container comprises a separate lambda function within AWS Lambda™.

4. The method of claim 3, wherein the multiple versions of the set of program code are executed by Google Lighthouse™ within the separate lambda functions.

5. The method of claim 1, wherein:
the multiple versions of the set of program code include two versions of the set of program code; and
said initiating multiple simultaneous executions of the two versions of the set of program code comprises, for each of multiple iterations:
configuring a first service container to sequentially execute a first version of the set of program code without caching, the first version of the set of program code with caching, a second version of the set of program code without caching, and the second version of the set of program code with caching;
configuring a second service container to sequentially execute the second version of the set of program code without caching, the second version of the set of program code with caching, the first version of the set of program code without caching, and the first version of the set of program code with caching; and
simultaneously executing the first service container and the second service container.

6. The method of claim 5, wherein:
the first service container is further configured to execute an additional first version of the set of program code prior to the first version of the set of program code without caching;
the second service container is further configured to execute an additional second version of the set of program code prior to the second version of the set of program code without caching; and
metrics collected during execution of the additional first and second versions of the set of program code are discarded.

7. The method of claim 1, wherein the set of program code is a web-based application.

8. The method of claim 1, wherein the plurality of metrics includes one or more of:
time to first page view;
time to interactive;
duration of time of main-thread work;
duration of time JavaScript® executed;
number of JavaScript® modules loaded;
number of JavaScript® bundles loaded;
number of API (Application Programming Interface) calls;
amount of data transferred via the API calls;
latency of the API calls; and
total amount of data transferred.

9. A non-transitory computer-readable medium storing instructions that, when executed by a processor, cause the processor to perform a method of comparing performances of multiple versions of a set of program code, the method comprising:
initiating multiple simultaneous executions of the multiple versions of the set of program code by, for each of multiple iterations:
configuring multiple separate service containers to sequentially operate the multiple versions of the set of program code in different orders; and
simultaneously executing the multiple separate service containers;
during the multiple simultaneous executions, collecting a plurality of metrics reflecting performance of the multiple versions of the set of program code;
for each version of the set of program code, aggregating the plurality of metrics across the multiple simultaneous executions; and
automatically displaying results that identify, for each metric, quantitative results for each of the multiple versions of the set of program code and a qualitative indication regarding relative performances of the multiple versions of the set of program code.

10. The non-transitory computer readable medium of claim 9, wherein the metrics reflect resource usage caused by execution of the multiple versions of the set of program code.

11. The non-transitory computer readable medium of claim 9, wherein:
the multiple versions of the set of program code include two versions of the set of program code; and
said initiating multiple simultaneous executions of the two versions of the set of program code comprises, for each of multiple iterations:
configuring a first service container to sequentially execute a first version of the set of program code without caching, the first version of the set of program code with caching, a second version of the set of program code without caching, and the second version of the set of program code with caching;
configuring a second service container to sequentially execute the second version of the set of program code without caching, the second version of the set of program code with caching, the first version of the set of program code without caching, and the first version of the set of program code with caching; and
simultaneously executing the first service container and the second service container.

12. The non-transitory computer readable medium of claim 11, wherein:
the first service container is further configured to execute an additional first version of the set of program code prior to the first version of the set of program code without caching;
the second service container is further configured to execute an additional second version of the set of program code prior to the second version of the set of program code without caching; and
metrics collected during execution of the additional first and second versions of the set of program code are discarded.

13. A computer system for comparing performances of multiple versions of a set of program code, comprising:
one or more processors; and
memory storing instructions that, when executed by the one or more processors, cause the system to:
initiate multiple simultaneous executions of the multiple versions of the set of program code by, for each of multiple iterations:
configuring multiple separate service containers to sequentially operate the multiple versions of the set of program code in different orders; and
simultaneously executing the multiple separate service containers;
during the multiple simultaneous executions, collect a plurality of metrics reflecting performance of the multiple versions of the set of program code;
for each version of the set of program code, aggregate the plurality of metrics across the multiple simultaneous executions; and
automatically display results that identify, for each metric, quantitative results for each of the multiple versions of the set of program code and a qualitative indication regarding relative performances of the multiple versions of the set of program code.

14. The system of claim 13, wherein the metrics reflect resource usage caused by execution of the multiple versions of the set of program code.

15. The system of claim 13, wherein each service container comprises a separate lambda function within AWS Lambda™.

16. The system of claim 15, wherein the multiple versions of the set of program code are executed by Google Lighthouse™ within the separate lambda functions.

17. The system of claim 13, wherein:
the multiple versions of the set of program code include two versions of the set of program code; and
said initiating multiple simultaneous executions of the two versions of the set of program code comprises, for each of multiple iterations:
configuring a first service container to sequentially execute a first version of the set of program code without caching, the first version of the set of program code with caching, a second version of the set of program code without caching, and the second version of the set of program code with caching;
configuring a second service container to sequentially execute the second version of the set of program code without caching, the second version of the set of program code with caching, the first version of the set of program code without caching, and the first version of the set of program code with caching; and
simultaneously executing the first service container and the second service container.

18. The system of claim 17, wherein:
the first service container is further configured to execute an additional first version of the set of program code prior to the first version of the set of program code without caching;
the second service container is further configured to execute an additional second version of the set of program code prior to the second version of the set of program code without caching; and
metrics collected during execution of the additional first and second versions of the set of program code are discarded.

19. The system of claim 13, wherein the set of program code is a web-based application.

20. The system of claim 13, wherein the plurality of metrics includes one or more of:
time to first page view;
time to interactive;
duration of time of main-thread work;
duration of time JavaScript® executed;
number of JavaScript® modules loaded;
number of JavaScript® bundles loaded;
number of API (Application Programming Interface) calls;
amount of data transferred via the API calls;
latency of the API calls; and
total amount of data transferred.

21. A method of comparing performances of multiple versions of a set of program code, the method comprising:
obtaining two versions of the set of program code, wherein each version differs from the other version;
for each of multiple iterations:
instantiating two containers;
configuring each container to execute the two versions of the set of program code in a different sequence;
simultaneously executing the containers; and
measuring usage of a plurality of resources during each execution of a version of the set of program code in each of the containers;
for each version of the set of program code, aggregating the resource usage measurements across all iterations and all container executions; and
outputting the aggregated resource usage measurements to include quantitative values for each resource for each version of the set of program code and qualitative indications of which of the multiple versions of the set of program code used each resource more efficiently;
wherein only a version of the set of program code that used resources more efficiently than the other version of the set of program code is released for execution in a production environment.

22. The method of claim 21, further comprising:
modifying an online monitoring tool configured to monitor a single web page to cause the tool to perform said simultaneous execution of the containers for the multiple iterations.

23. The method of claim 21, wherein within each container, each version of the set of program code is executed at least once with inactive caching and at least once with active caching.

* * * * *